ROWLAND E. BALL
INVENTOR.

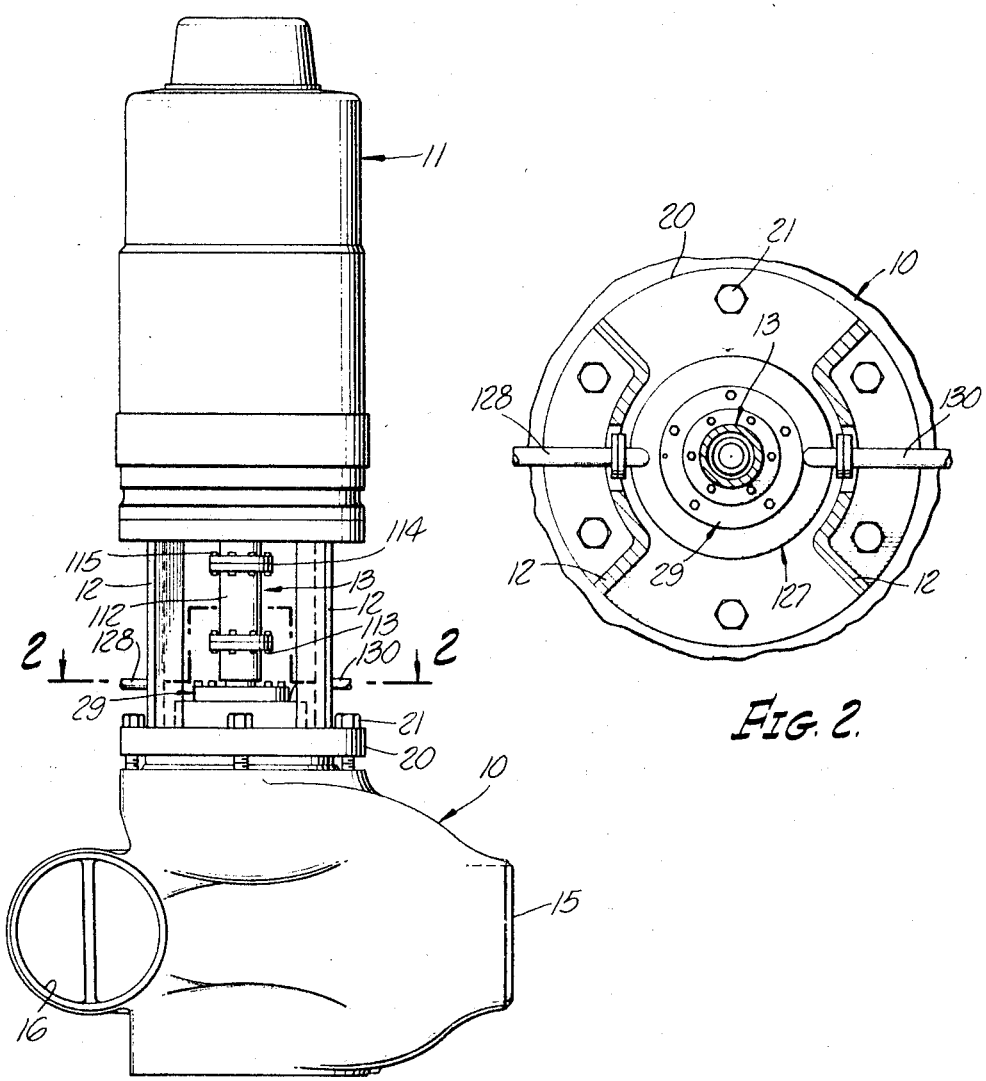

BY John O. Evans, Jr.
ATTORNEY

Aug. 5, 1969

R. E. BALL 3,459,430

MECHANICAL SEAL ASSEMBLY

Filed July 6, 1967

ROWLAND E. BALL
INVENTOR.

BY John O. Evans, Jr.

ATTORNEY

United States Patent Office 3,459,430
Patented Aug. 5, 1969

3,459,430
MECHANICAL SEAL ASSEMBLY
Rowland E. Ball, Long Beach, Calif., assignor to Borg-Warner Corporation, Chicago, Ill., a corporation of Illinois
Filed July 6, 1967, Ser. No. 651,466
Int. Cl. F16j 15/40, 15/00; F16k 41/00
U.S. Cl. 277—3      7 Claims

ABSTRACT OF THE DISCLOSURE

A mechanical seal assembly for sealing a rotary shaft to a housing containing fluid under pressure, the assembly being in the form of a cartridge that may be installed and removed as a unit over the end of the shaft. The assembly has inboard and outboard mechanical seal subassemblies arranged in tandem, and may include a pressure breakdown system for proportioning the pressure drop across each mechanical seal subassembly.

BACKGROUND OF THE INVENTION

Field of the invention

This invention relates to a mechanical seal assembly, and more particularly to such an assembly for sealing a rotary shaft to the housing of a vessel containing fluid under high pressure and at elevated temperature, the mechanical seal assembly having inboard and outboard mechanical seal subassemblies and preferably being in the form of a cartridge that is installed on and removed from the housing and shaft as a unit. The assembly may also include pressure-breakdown devices for insuring that each seal subassembly carries its prescribed share of the total pressure drop to which the entire assembly is subjected.

Description of the prior art

Mechanical seal devices having inboard and outboard seals arranged in tandem are known, as exemplified by the mechanical seal arrangement shown in FIG. 4 of U.S. Patent No. 2,824,759, issued February 25, 1958, H. E. Tracy, "Liquid Cooled Seal." Many of the parts of this known seal are installed on the shaft one by one. This assembly operation entails the expenditure of considerable time and involves the possibility of faulty installation of one or more of the parts, with attendant malfunctioning of the seal.

Pressure-breakdown devices for tandem mechanical seals are also known, and are disclosed in U.S. application Ser. No. 390,050, filed Aug. 17, 1964, now Patent No. 3,360,272, Carl J. Blom et al., "Pressure Staging Mechanical Seal," which application is assigned to the assignee of the present application. These known pressure-breakdown devices, owing to the way in which they are structurally associated with their related mechanical seal components, are not easy to manufacture and are time consuming to install.

Summary of the invention

An object of the invention is to provide a tandem mechanical seal assembly that may be easily and quickly installed and removed as a unit from a pump or other pressure vessel, which seal when installed prevents flow of fluid from the vessel outwardly along a rotary shaft extending through the wall of the vessel.

Another object is to provide such an assembly, the parts of which may be put together with care and the assembly tested in a shop prior to installation of the unit on a pump or the like in the field.

Another object is to provide, as part of such unitary mechanical seal assembly, pressure-breakdown means for regulating the pressure differential across one or more of the tandemly arranged, mechanical seal subassemblies.

The foregoing and other objects and advantages of the invention, as may appear from the drawings and the following description of the preferred embodiment of the invention, are realized in a mechanical seal assembly for sealing a rotary shaft to the housing of a vessel containing fluid under pressure, the housing having a shaft opening through which the shaft extends, the shaft terminating in a free end external to the vessel, the mechanical seal assembly including a shaft sleeve mounted on the shaft for rotation therewith and sealed to the shaft; an annular member mounted on and sealed to the housing and surrounding the shaft sleeve, the annular member providing an annular recess having an annular opening that faces the shaft sleeve; inboard mechanical seal means for precluding substantial flow along the shaft sleeve of fluid from the vessel into the recess, the inboard mechanical seal means including a stationary sealing ring mounted on the annular member and a complementary rotary sealing ring mounted on the shaft sleeve; outboard mechanical seal means for precluding substantial flow along the shaft sleeve of fluid from the recess to the exterior of the annular member, the outboard mechanical seal means including a stationary sealing ring disposed within the recess and mounted on the annular member, and a complementary rotary sealing ring disposed within the recess and mounted on the shaft sleeve; means including a fastener operable from the exterior of the annular member for releasably mounting the annular member on the housing; means including a fastener operable from the exterior of the annular member for releasably mounting the shaft sleeve on the shaft; and the shaft sleeve, the annular member, the inboard mechanical seal means, and the outboard mechanical seal means being removable as a unit over the free end of the shaft upon release of both the annular member mounting means and the shaft sleeve mounting means. The annular member may include first pressure reducing cell means bridging the inboard mechanical seal means and communicating the interior of the pressure vessel with the recess, and second pressure reducing cell means bridging the outboard mechanical seal means and communicating the recess with the exterior of the vessel.

BRIEF DESCRIPTION OF THE DRAWINGS

FIG. 1 is an elevational view of a pump-motor unit having a mechanical seal assembly in accordance with the invention;

FIG. 2 is a horizontal sectional view taken along the line 2—2 of FIG. 1 and looking in the direction of the arrows;

DESCRIPTION OF THE PREFERRED EMBODIMENT

Figure 3:
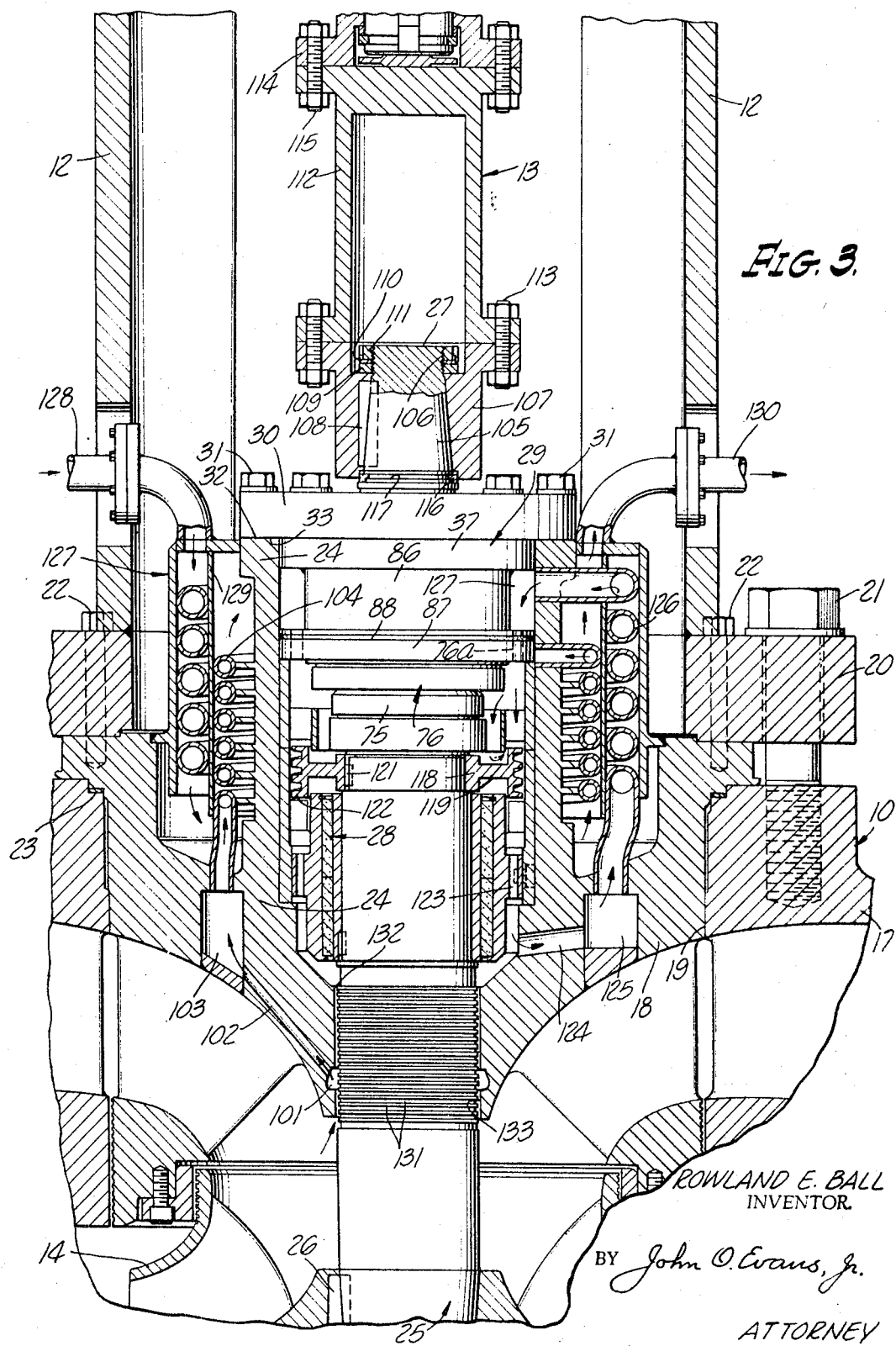
FIG. 3 is an enlarged, axial, sectional view of a portion of the pump-motor unit shown in FIGS. 1 and 2.

In the several views of the drawings and in this description, the same part is always designated by the same reference numeral.

Referring to the drawings, particularly to FIGS. 1 and 2, the pump-motor unit shown has a pump 10 and an electric motor 11 supported on the pump by a pair of struts 12, 12. A drive line 13 drivingly connects the motor to the pump impeller 14, seen in FIG. 3.

The pump 10, itself, forms no part of the present invention, and is merely illustrative of a vessel containing fluid under pressure with which the mechanical seal assembly of the invention is used. However, as shown, the pump 10 is a double-volute, double-suction pump having an intake or suction opening 15 and a discharge opening 16.

Moreover, the electric motor 11 is merely illustrative of any suitable motor for driving the pump.

Referring to FIG. 3, the pump 10 has a housing 17 including, as a part thereof, a stuffing box casting 18. The latter is fitted in an opening 19 in the housing and secured to the housing by a clamping ring 20 fastened to the housing by bolts 21. Other and smaller bolts 22 fasten the clamping ring to the stuffing box casting, the latter being sealed to the pump housing by a gasket ring 23.

The stuffing box casting has an integral stuffing box 24 of generally tubular shape, which provides an opening in the pump housing through which the impeller shaft 25 passes. The shaft is drivingly connected to the impeller 14 by a key 26, and terminates externally of the pump housing in a free end 27. Within the stuffing box is a radial bearing 28 in which the shaft 25 is journalled. Axial thrust is carried in the motor 11 by a heavy-duty pivot-shoe thrust bearing (not shown).

Above the radial bearing 28 and arranged to seal the rotary shaft 25 to the stuffing box 24 is a mechanical seal cartridge in accordance with the invention and designated by the general reference numeral 29.

Figure 4:
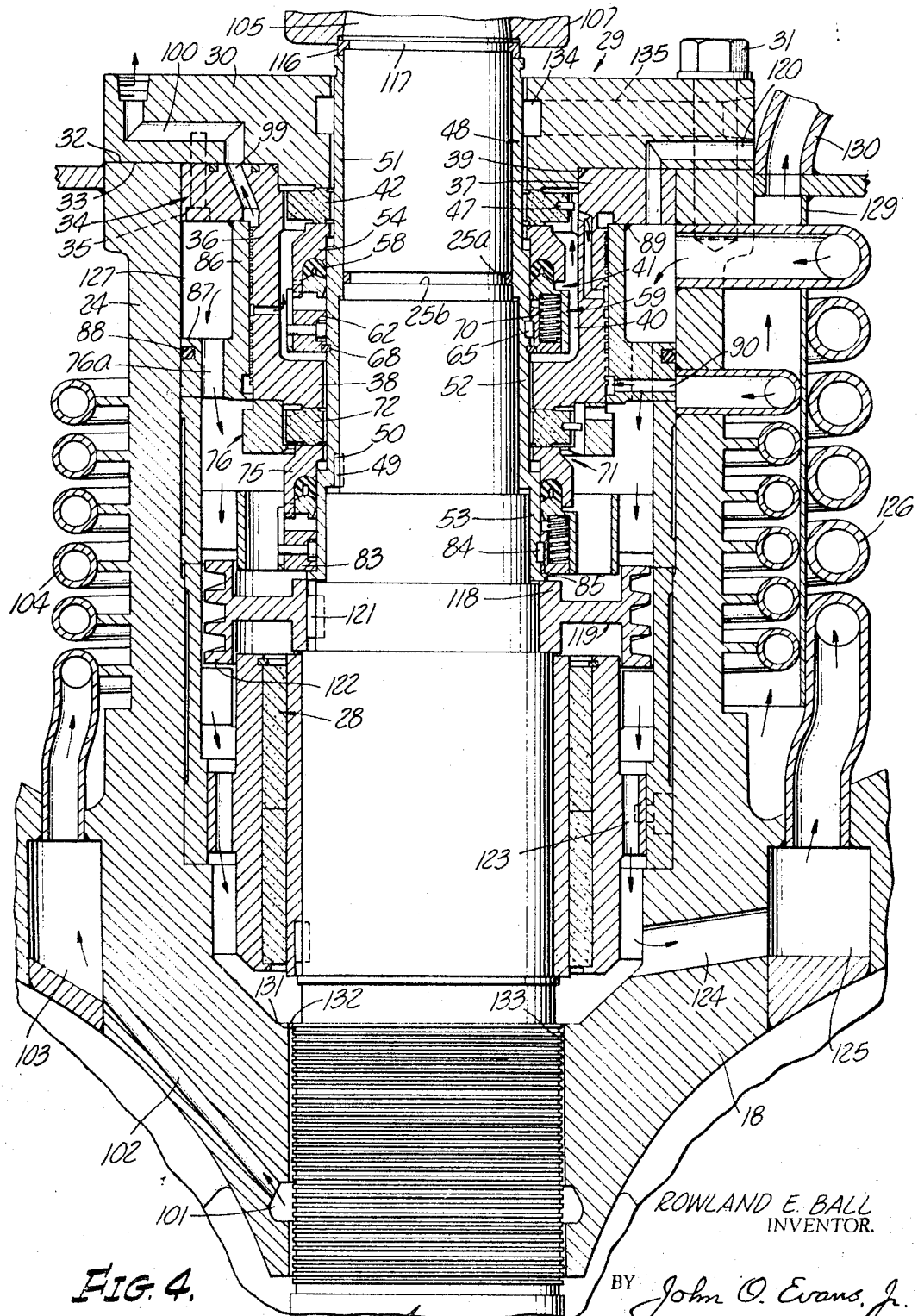
FIG. 4 is a further enlarged, axial, sectional view of a fragment of the portion of the unit shown in FIG. 3.
Figure 5:
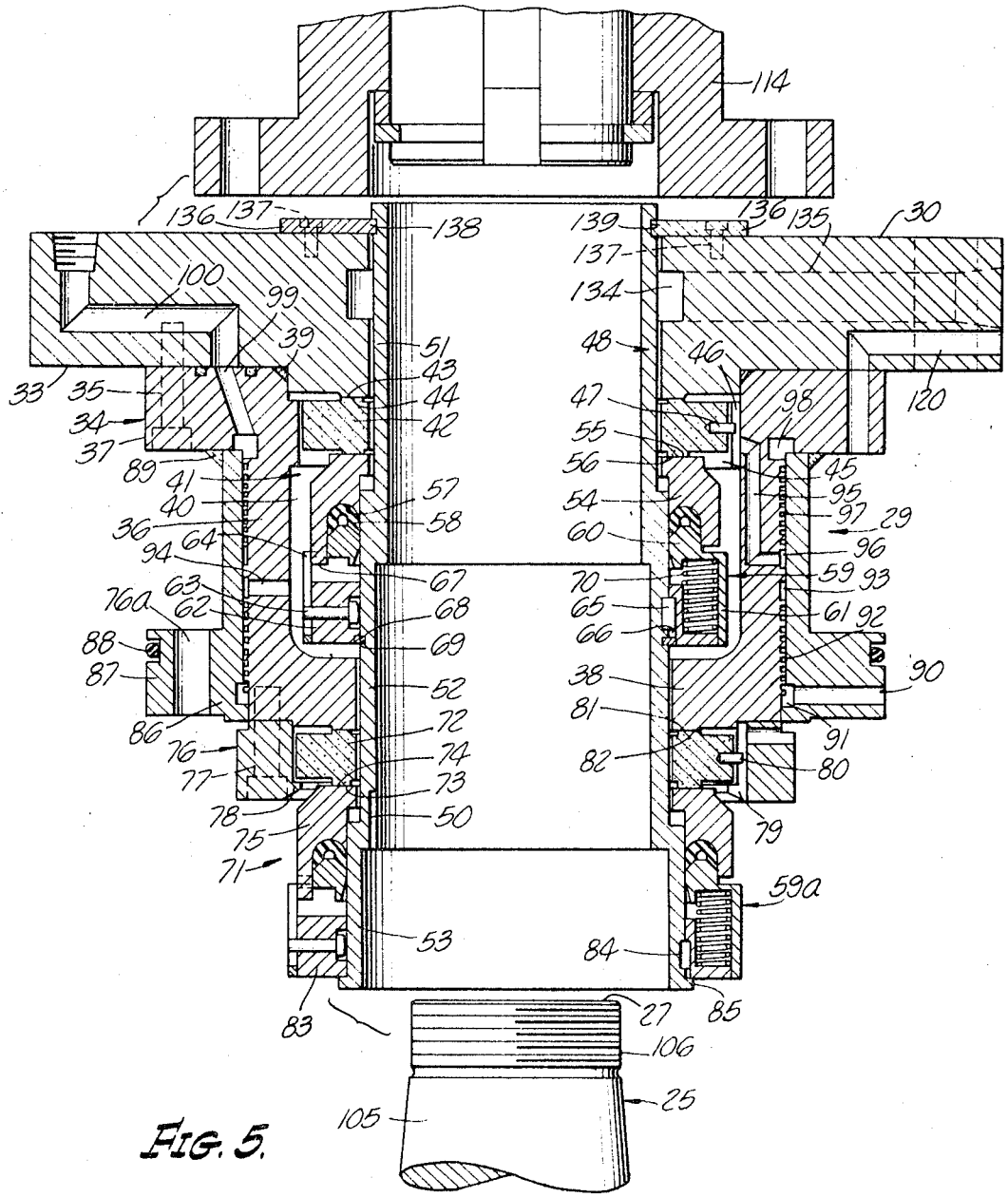
FIG. 5 is a still further enlarged, axial, sectional view of the mechanical seal cartridge shown in FIGS. 1 to 4, the cartridge being illustrated as removed from the pump shaft and the pump housing and disposed between the pump shaft and the motor shaft.

As best seen in FIGS. 4 and 5, to which reference is now made, the mechanical seal cartridge 29 has a stuffing box flange 30 secured to the outer end of the stuffing box 24 by bolts 31. The end surface 32 of the stuffing box and the contacting surface 33 of the flange 30 are accurately machined and finished to provide a fluid-tight joint therebetween when the bolts 31 are tightened. If desired, a seal, such as a gasket ring, may be interposed between the surfaces 32 and 33.

An annular body 34 is releasably fastened by Allen-head screws 35 (see FIG. 5) to the bottom of the flange 30. The body has a central cylindrical portion 36, a radially outwardly extending ring portion 37 at the top, and a radially inwardly extending ring portion 38 at the bottom. An O-ring 39 seals the annular body 34 to the flange 30.

It will be seen that the stuffing box flange 30 with the attached annular body 34 provide an annular recess 40 having a radially inwardly facing annular opening. Within this recess is located an outboard mechanical seal subassembly 41 having a stationary sealing ring 42, preferably made of carbon. As seen in FIG. 5, this sealing ring has a radially extending, annular surface 43 on its axially outer side that is in contact with a mating surface 44 on the underside of the stuffing box flange. The surfaces 43 and 44 are lapped to optical flatness and form a fluid-tight joint between the ring and the flange.

The annular body 34 has a radially inwardly projecting, annular land member 45 that closely surrounds the sealing ring 42 to center it. A longitudinal groove 46 extends through the land member 45 and receives the end of a pin 47 carried by the sealing ring 42 to prevent rotation of the ring.

As seen in FIG. 4, a shaft sleeve 48 is mounted on the impeller shaft 25. An axially extending key 49 is carried by the shaft and is received in a longitudinal keyway 50 in the sleeve for turning the sleeve with the shaft. The sleeve has an axially outer section 51 having an outside diameter such that it is radially spaced from the inner peripheries of the stuffing box flange 30 and the sealing ring 42. The sleeve has an intermediate section 52 with an outside diameter somewhat larger than that of the outer section 51, and an axially inner section 53 with an outside diameter yet larger. The shaft sleeve is sealed to the shaft by an O-ring seal 25a received in a circumferential groove 25b in the shaft.

The outboard mechanical seal subassembly has a rotary sealing ring 54 mounted on the intermediate section of the shaft sleeve and positioned within the recess 40. This ring is preferably made of sintered tungsten carbide. It has a radial, annular sealing surface 55 in rotary sliding sealing engagement with a complementary, radial, annular sealing surface 56 on the stationary sealing ring 42. The cooperating sealing surfaces 55 and 56 are optically flat, so that leakage of fluid between them will be normally restricted to the minimum necessary to furnish a lubricating film between them.

The rotary sealing ring 54 is axially slidable on and rotatable with the shaft sleeve. This ring has a groove 57 cut into its axially inner face, the groove receiving a U-cup seal 58. A pusher ring 59 has an expander head 60 that, when moved axially outwardly, expands the U-cup seal to insure against fluid leakage between the rotary sealing ring 54 and the shaft sleeve 48. The pusher ring also urges the rotary sealing ring 54 axially outwardly to bring the complementary faces 55, 56 into sealing relationship. The pusher ring has a skirt 61 that surrounds a driver ring 62, the latter having a pin 63 engaged in a longitudinal slot 64 in the skirt of the pusher ring, whereby the pusher ring is rotated with the driver ring and is axially slidable with respect thereto. A key 65, carried by the shaft sleeve and working in a longitudinal slot 66 in the driver ring turns the driver ring with the shaft sleeve. A longitudinal tang 67 on the rotary sealing ring 54 is engaged in the slot 64 of the pusher ring skirt so that the rotary sealing ring is rotated by the pusher ring, yet may move axially with respect to it. A snap ring 68, in a circumferential groove 69 in the shaft sleeve, is engaged by the driver ring 62 to prevent axially inward movement of the latter on the shaft sleeve. One or more springs 70, under compression between the driver ring 62 and the pusher ring 59, resiliently urge the pusher ring axially outwardly of the shaft sleeve to expand the U-cup seal and urge the sealing surfaces 55, 56 of the sealing rings into mutual sealing relationship.

The mechanical seal cartridge of the invention also includes an inboard mechanical seal subassembly designated by the general reference numeral 71. This subassembly is in many respects similar to the outboard mechanical seal subassembly 41 described hereinbefore. As does the outboard subassembly, the inboard subassembly includes a stationary sealing ring 72 with a sealing surface 73 engaging the relatively rotatable sealing surface 74 on the rotary sealing ring 75. The devices for driving the rotary sealing ring 75 with the shaft sleeve 48, for permitting axial movement of the rotary sealing ring, for sealing the rotary sealing ring to the shaft sleeve, and for resiliently urging the rotary sealing ring axially outwardly into engagement with the stationary sealing ring 72 are analogous to the corresponding devices of the outboard mechanical seal subassembly hereinbefore described.

A salient difference between the inboard subassembly and the outboard subassembly is in the mounting of the stationary sealing rings. The stationary sealing ring 72 of the inboard subassembly is carried by and sealed to the annular body 34. A retainer ring 76 surrounds the sealing ring 72 and is removably fastened to the annular body 34 by means of screws 77, one only of which is shown in FIG. 5. The retainer ring surrounds the sealing ring with a small radial clearance and has an inturned flange 78 that partially overlies the axially inward surface of the sealing ring and is spaced from it. The retainer ring also has a longitudinal slot 79 that receives the end of a pin 80 carried by the sealing ring 72 to restrain the stationary sealing ring from rotation. Plane, polished, radial mated surfaces 81, on the sealing ring 72, and 82, on the annular body, provide a static seal between the sealing ring and the body.

The driver ring 83 of the inboard mechanical seal subassembly is keyed to the shaft sleeve 48 by a key 84 and abuts a flange 85 on the inner end of the shaft sleeve.

Telescoped over the central cylindrical portion 36 of the annular body is a sleeve member 86 having a flange 87 sealed to the stuffing box 24 by an O-ring seal 88. The sleeve member 86 is welded at 89 to the top ring portion 37 of the annular body.

Pressure-breakdown means are included in the preferred embodiment of the cartridge seal assembly. An inlet bore 90 in the flange 87 conducts fluid into a circumferential channel 91 in the sleeve member 86. The channel 91 introduces the fluid into a first pressure reducing cell 92, which is in the form of a helical groove provided in the outer surface of the central cylindrical portion 36. The pressure reducing cell discharges the fluid into a peripheral channel 93, also formed in the outer surface of the portion 36. From the channel 93, the fluid is conducted via the bore 94 into the annular recess 40 between the inboard and outboard mechanical seal subassemblies. From this annular recess, fluid flows through a passage 95 into an annular channel 96 that feeds the fluid into a second pressure reducing cell 97, which is provided by a helical groove in the outer surface of the portion 36. The second pressure reducing cell empties the fluid into an annular collector grove 98. Fluid is discharged from the collector groove through a passage 99 in the annular body and a connecting passage 100 in the stuffing box flange 30 into a receptacle (not shown) maintained at atmospheric or other low pressure.

As seen in FIG. 4, the fluid that flows through the pressure-breakdown means is taken from a groove 101 that surrounds the shaft 25 and is provided in the stuffing box casting 18. This fluid is at a pressure substantially equal to the pressure in the stuffing box. The fluid flows from the groove 101 through the passageways 102 and 103, thence through the cooling coil 104, and into the inlet bore 90 of the pressure-breakdown means.

From the foregoing description of the pressure-breakdown means, it will be understood that liquid, originally at stuffing box pressure, flows sequentially through the first pressure reducing cell 92, through the annular recess 40 and through the second pressure reducing cell 97, and then is discharged at a low pressure, such as atmospheric pressure. The two pressure reducing cells are of substantially equal length, and of substantially equal, small cross-section and serve to maintain the pressure in the annular recess 40 between the inboard and outboard seals at a value which is substantially the mean of stuffing box pressure and atmospheric pressure. Thus, the inboard and outboard mechanical seal subassemblies are each subjected to substantially the same pressure drop, which is maintained independently of leakage past the relatively rotating sealing surfaces, and each seal subassembly carries an equal share of the total pressure drop across the entire sealing assembly. As the rate of flow of liquid through the pressure-breakdown means is much greater than the rates of fluid leakage across the relatively rotating sealing surfaces of the sealing rings, the former exerts a predominant effect and the pressure drop across the two mechanical seal subassemblies is substantially independent of the rates of leakage across the relatively rotating sealing surfaces. Of course, the pressure reducing cells 92 and 97 can be designed to give in the annular recess 40 any desired pressure between stuffing box and external pressures.

As best seen in FIG. 3, the upper or outer end of the impeller shaft has a tapered portion 105 and a terminal threaded portion 106. A correspondingly tapered, driven coupler member 107 is fitted on the shaft, and a key 108 drivingly connects the coupler member to the shaft. A nut 109 is threaded on the threaded portion 106 of the shaft to retain the coupler member in place, and a lock washer 110 and a lock nut 111 prevent the nut 109 from coming loose. An intermediate coupler 112, having end flanges, is bolted to the driven coupler member 107 by bolts 113 and to a driving coupler member 114 by bolts 115. As the driving coupler member 114 is turned by the motor 11, the impeller shaft 25 is rotated through the medium of the coupler elements 112 and 107. Upon removal of the bolts 113 and 115, the intermediate coupler may be laterally withdrawn from between the driving and driven coupler members 114 and 107.

As best seen in FIG. 4, a snap ring 116, received in a groove 117 in the impeller shaft 25, abuts the outer end of the shaft sleeve 48, preventing the latter from moving outwardly on the shaft. The flange 85 on the inner end of the shaft sleeve abuts the hub 118 of a stuffing box impeller 119, thereby preventing inward movement of the shaft sleeve on the shaft.

A vent 120, normally closed in operation by a plug (not shown), is provided for venting the chamber within the stuffing box casting 18.

As the mechanical seal assembly of this invention may be, and in the illustrated embodiment is, used to seal a liquid at high temperature in the pump housing 17, a brief description of the equipment for cooling the seal arrangement and the radial bearing 28 will now be given with particular reference to FIG. 3.

Referring to FIG. 3, it is seen that the stuffing box impeller 119 is caused to rotate with the shaft 25 by a key 121 engaging both the shaft and the impeller. The impeller is of the axial type having an impeller screw 122 at its periphery. The hand of the screw is such that, upon its rotation, liquid in the stuffing box chamber is moved downwardly in the chamber. The liquid flows through the passages 123 in the bearing 28, and, as indicated by arrows, through the bores 124 and 125 into the cooling coil 126. The liquid, after passing through the cooling coil wherein it is cooled, flows into a cooling jacket 127 in the upper part of the stuffing box 24. From this jacket, the cooled liquid flows downwardly in the stuffing box through the openings 76a to return to the impeller 119 for recirculation. It is thus seen that cooled liquid is caused to flow over heat dissipating surfaces of the mechanical seal cartridge 29 and the radial bearing 28 to cool these components. The heat absorbed in the liquid is dissipated from the cooling coil into a liquid coolant that flows over and around the coil.

The cooling coil 126 and the cooling coil 104, that cools the liquid flowing through the pressure-breakdown means associated with the mechanical seals, are both contained within a cooling jacket 127. A coolant inlet 128 admits coolant into the jacket from a source (not shown). A cylindrical partition 129 separates the cooling coil 126 from the cooling coil 104 so as to cause the coolant to flow first over the coil 126 and then over the coil 104. Coolant is discharged from the cooling jacket 127 through an outlet 130. The flow path of coolant through the cooling jacket is indicated by arrows in FIG. 3.

A labyrinth seal, including parallel, circumferential grooves 131 in a periphery of the shaft 25, seals the interior of the stuffing box 24 from the interior of the pump housing 17. This labyrinth seal, owing to the small clearance 132 between the shaft 25 and the bore 133 of the stuffing box casting 18, allows some liquid to flow from the interior of the pump housing 17 into the groove 101 and through the pressure breakdown means. The clearance 132 also permits some liquid to flow from the pump housing into the stuffing box to replace the small amount of liquid that leaves the stuffing box as leakage past the relatively rotating sealing faces of the mechanical seal subassemblies. In the event of failure of the mechanical seal cartridge, for example, the labyrinth seal will restrict the loss of liquid from the pump housing.

A drain groove 134 is provided in the stuffing box flange 30 around the shaft sleeve 48 near its outer end.

A drain passage 135 connects the drain groove with the exterior and may be connected by piping (not shown) to a drain sump (not shown). Leakage past the mechanical seal faces is conducted away through these drain facilities.

The mechanical seal cartridge 29 may be easily and quickly removed from the stuffing box 24. To do this, the bolts 113 and 115 are removed, and the intermediate coupler 112 is withdrawn laterally from between the coupler members 107 and 114. The lock nut 111, the lock washer 110 and the nut 109 are then removed from the shaft 25. Next, the coupler member 107 and the key 108 are pulled from the shaft. The snap ring 106 is removed from the shaft. The bolts 31 that fasten the cartridge to the stuffing box are unthreaded and withdrawn. The cartridge 29 is next withdrawn from the stuffing box 24 axially outwardly of the shaft and clear of the end 27 of the shaft to the position shown in FIG. 5. From this position, the cartridge is moved to the side and is then completely free of the motor and pump assembly. A replacement mechanical seal cartridge may be readily installed in the motor and pump assembly in an obvious manner by reversing the steps followed in removing the cartridge 29.

In removing the cartridge 29 from the shaft 25 and in inserting a replacement cartridge, a pair of temporary locking plates 136 (see FIG. 5) are used to lock the shaft sleeve 48 to the stuffing box flange 30 for the purpose of preventing axial movement of the shaft sleeve together with the parts carried by it relative to the flange together with the parts mounted on it. The locking plates 136 are fastened to the flange 30 by screws 137 with the radially inner edges 138 of the plates projecting into a locking groove 139 provided in the shaft sleeve. The locking plates are detached before disassembling the cartridge.

To disassemble the cartridge, the bolts 35 are unscrewed and withwrawn, and the stuffing box flange 30 is removed over the upper end of the shaft sleeve 48. The stationary sealing ring 42, the rotary sealing ring 54, the pusher ring 59 and the driver ring 62 are then removed from the shaft sleeve 48 by sliding them axially and upwardly over the top of the shaft sleeve. After removal of the snap ring 68 from the shaft sleeve, the annular body 34 with the attached retainer ring 76 and the stationary sealing ring 72 are removed over the top of the shaft sleeve. If the retainer ring is then separated from the annular body 34 after removal of the screws 77, the stationary sealing ring can be detached from the annular body. Finally, the rotary sealing ring 75, the pusher ring 59a and the driver ring 83 are withdrawn over the end of the shaft sleeve to complete the disassembly of the cartridge. The cartridge is reassembled in a way that will be evident from the immediately preceding description of its disassembly.

The operation of the mechanical seal cartridge of the invention will be understood from the foregoing description. In normal operation, the main pump circulates water at a pressure of about 1,000 p.s.i. and a temperature of about 500° F. The stuffing box is initially vented through the vent 120, which is then closed. The pressure in the stuffing box is only slightly less than the pressure in the main pump. Flow of water through the pressure-breakdown means establishes a pressure of about 500 p.s.i. in the annular chamber 40, thereby subjecting each of the outboard and inboard mechanical seal subassemblies to a pressure differential of 500 p.s.i. Normal leakage past the mechanical seal faces is only a few drops per minute. Normal flow through the pressure-breakdown system is about three-fourths of a gallon per minute. Cooling water at about 50 p.s.i. and 75° F. is flowed through the cooling jacket 127 at a rate of about 25 gallons per minute to properly cool the apparatus.

Of course, the invention is not limited to a cartridge having but two mechanical seal subassemblies in tandem, but also may include a cartridge having three or more mechanical seal subassemblies arranged in series. In such arrangements, a corresponding number of pressure reducing cells may be employed in series in the pressure-reducing means for bridging the mechanical seal subassemblies to control the pressure drop across each. Where three or more mechanical seal subassemblies are arranged in series, each pair of adjacent subassemblies may be considered as comprising an inboard subassembly and an outboard subassembly.

From the foregoing description, it is seen that the present invention provides a mechanical seal assembly in the form of a cartridge that can be removed and replaced with a spare cartridge easily and quickly. The cartridge, when removed, can be readily repaired. The cartridge has an integral pressure-breakdown system obviating the need for external pressure control devices.

I claim:

1. A mechanical seal assembly for sealing a rotary shaft to the housing of a vessel containing fluid under pressure, the housing having a shaft opening through which the shaft extends, the shaft terminating in a free end external to the vessel, including:
  (a) a shaft sleeve mounted on the shaft for rotation therewith and sealed to the shaft;
  (b) an annular member mounted on and sealed to the housing and surrounding said shaft sleeve, said anannular member providing an annular recess having an annular opening that faces said shaft sleeve;
  (c) inboard mechanical seal means for precluding substantial flow along said shaft sleeve of fluid from the vessel into said recess, said inboard mechanical seal means including a stationary sealing ring mounted on said annular member and a complementary rotary sealing ring mounted on said shaft sleeve;
  (d) outboard mechanical seal means for precluding substantial flow along said shaft sleeve of fluid from said recess to the exterior of said annular member, said outboard mechanical seal means including a stationary sealing ring disposed within said recess and mounted on said annular member, and a complementary rotary sealing ring disposed within said recess and mounted on said shaft sleeve;
  (e) means including a fastener operable from the exterior of said annular member for releasably mounting said shaft sleeve on the shaft;
  (f) means including a fastener operable from the exterior of said annular member for releasably mounting said annular member on the housing; and
  (g) said shaft sleeve, said annular member, said inboard mechanical seal means, and said outboard mechanical seal means being removable as a unit over the free end of the shaft upon release of both said annular member mounting means and said shaft sleeve mounting means.

2. A mechanical seal assembly as defined in claim 1 wherein said means for releasably mounting said shaft sleeve on the shaft comprise an axially outwardly facing abutment on the shaft, and an axially inwardly facing abutment on the inner end of said sleeve engaging said outwardly facing abutment to prevent inward movement of said sleeve on the shaft; and an outwardly facing shoulder on the outer end of said sleeve, and second abutment means removably secured to the shaft and engaging said outwardly facing shoulder to retain said sleeve on the shaft.

3. A mechanical seal assembly as defined in claim 1 wherein said annular member comprises an axially inner portion, an axially outer portion, and means for releasably securing said portions together, whereby, after said sleeve, said annular member, said inboard mechanical seal means, and said outboard mechanical seal means are removed as a unit over the end of the shaft, and upon release of said means for releasably securing said portions together, said axially outer portion is removable over the axially outer end of said sleeve to open said recess to provide access to said sealing rings of said outboard mechanical seal means.

4. A mechanical seal assembly as defined in claim 1 wherein said annular member comprises first pressure reducing cell means bridging said inboard mechanical seal means and communicating the interior of the pressure vessel with said recess, and second pressure reducing cell means bridging said outboard mechanical seal means and communicating said recess with the exterior of the vessel.

5. A mechanical seal assembly as defined in claim 4 wherein said annular member comprises a radially inner portion having a cylindrical outer surface and a radially outer portion having a cylindrical inner surface sealingly engaging said outer surface, and each of said pressure reducing cell means comprises means providing a generally helical groove opening into one of said surfaces.

6. A mechanical seal assembly as defined in claim 4 wherein the shaft and the housing wall have cooperating elements providing a labyrinth seal disposed axially inwardly of said inboard mechanical seal means, and said first pressure reducing cell means is in communication with the interior of the pressure vessel at a location between said cooperating elements for communicating the interior of the pressure vessel with said recess.

7. A mechanical seal assembly as defined in claim 3 wherein said axially outer portion comprises a flange mounted to the exterior of the housing and said axially inner portion comprises a generally tubular member extending within the shaft opening, and bolt means are provided for releasably securing said portions together, said annular recess being formed in said generally tubular member, and said flange providing an end closure for said recess.

References Cited
UNITED STATES PATENTS

| | | | |
|---|---|---|---|
| 2,824,759 | 2/1958 | Tracy | 277—22 X |
| 3,166,330 | 1/1965 | Boutros | 277—9 X |
| 3,360,272 | 12/1967 | Blom et al. | 277—3 |

SAMUEL ROTHBERG, Primary Examiner

U.S. Cl. X.R.
277—9, 38, 65